United States Patent [19]

Fuller

[11] 4,034,609
[45] July 12, 1977

[54] DIGITAL SENSING DEVICE

[76] Inventor: David L. Fuller, 1110 Mountain Creek Trail, Atlanta, Ga. 30328

[21] Appl. No.: 646,038

[22] Filed: Jan. 2, 1976

[51] Int. Cl.² ........................................ G01W 1/02
[52] U.S. Cl. ..................................... 73/335; 73/73
[58] Field of Search ............. 73/335, 356, 358, 73; 116/114.5

[56] References Cited

U.S. PATENT DOCUMENTS

| 3,002,385 | 10/1961 | Wahl et al. | 73/356 |
|---|---|---|---|
| 3,175,401 | 3/1965 | Geldmacher | 73/358 |
| 3,440,882 | 4/1969 | Jones | 73/356 |
| 3,548,639 | 12/1970 | Krause | 73/335 X |
| 3,576,761 | 4/1971 | Davis | 73/356 X |
| 3,631,720 | 1/1972 | Weinstein et al. | 73/358 |
| 3,859,856 | 1/1975 | Keele et al. | 73/356 |
| 3,864,976 | 2/1975 | Parker | 73/356 |
| 3,878,722 | 4/1975 | Crites | 73/356 |

Primary Examiner—Richard C. Queisser
Assistant Examiner—Joseph W. Roskos
Attorney, Agent, or Firm—B. J. Powell

[57] ABSTRACT

A multiple laminae humidity sensing device for visually indicating changes in relative humidity including a moisture impermeable transparent support layer having a viewing side and a sensing side opposite said viewing side; an indicator layer with a plurality of filter cells, each including a transparent carrier material and an inorganic salt composition dispersed in the transparent carrier material that provides a known visible color response to changes in relative humidity on the sensing side of the support layer and a moisture permeable reflective layer behind the indicator layer so that light passing through the support layer and the indicator layer is reflected back through the indicator layer and the support layer through the viewing side of the support layer so as to be readily visible from the viewing side of the support layer.

12 Claims, 8 Drawing Figures

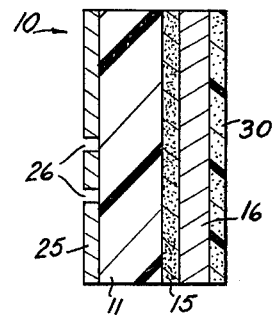
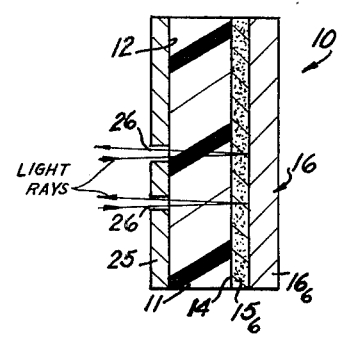
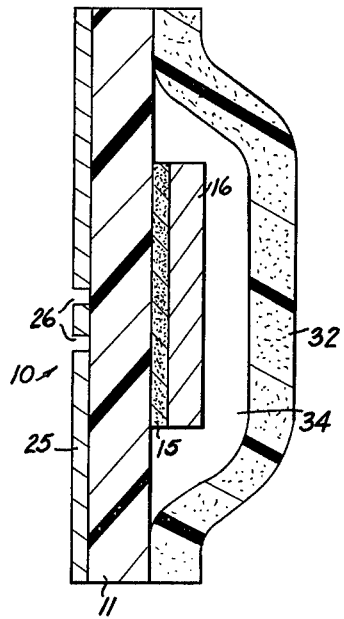
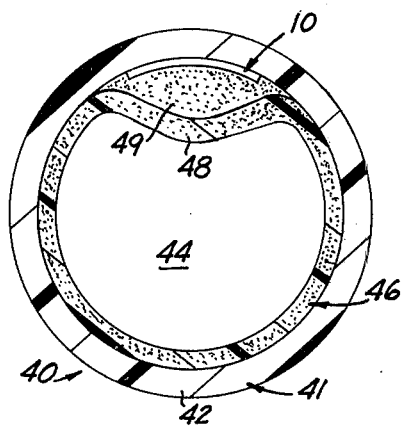
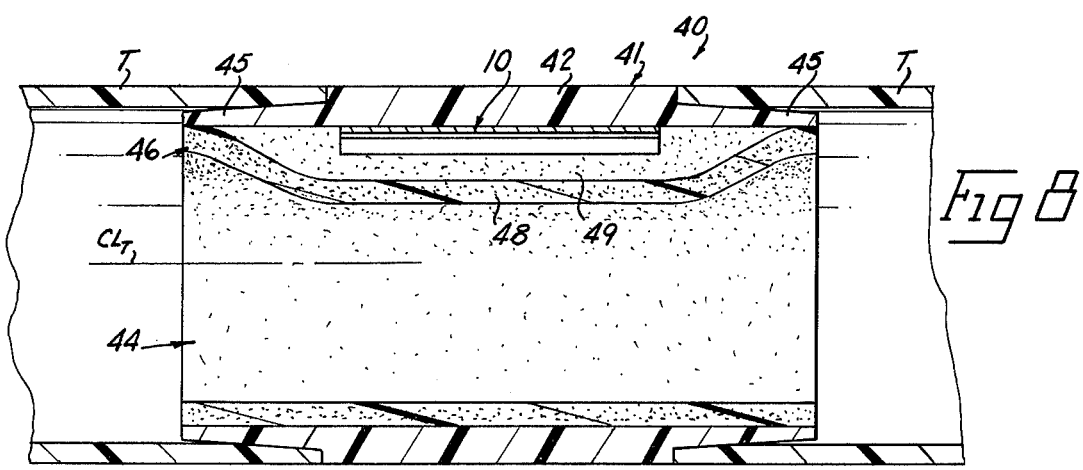

DIGITAL SENSING DEVICE

BACKGROUND OF THE INVENTION

This invention relates generally to sensing devices and more particularly to sensing devices which use inorganic chemical salt compositions that change color in response to changes in certain conditions such as humidity and/or temperature so that a visual representation of such conditions are indicated, normally in digital form.

A number of sensing devices have been proposed which utilize inorganic chemical salt compositions that change color in response to changes in certain conditions such as relative humidity. Examples of such devices which utilize inorganic chemical salt compositions to sense changes in relative humidity are illustrated in U.S. Pat. Nos. 2,249,867 and 3,680,364. These types of such prior art sensing devices have a common problem in that it is relatively difficult to visually perceive changes in the color of the inorganic chemical salt compositions in response to small changes in the relative humidity being sensed. Another problem associated in the manufacture of such prior art sensing devices is the difficulty in insuring that the inorganic chemical salt compositions are distributed uniformly throughout the visual area of the device to insure adequate representation of the changes in the condition. Prior art thermometers have also been suggested which utilize encapsulated organic liquid crystal compositions that change color in response to certain changes in temperature. Examples of such prior art thermometers are illustrated in Pat. Nos. 3,861,213; 3,704,625; and 3,661,142. One of the problems associated with such prior art thermometers is the difficulty in applying the organic liquid crystal compositions in the desired configuration and consistency to obtain the desired temperature response. Another problem associated with such prior art thermometers is that the organic liquid crystal compositions rapidly deteriorate when exposed to ultraviolet radiation.

SUMMARY OF THE INVENTION

These and other problems and disadvantages associated with the prior art sensing devices with a visual display using inorganic chemical salt compositions or organic liquid crystal compositions that change color in response to changes in certain conditions such as temperature and/or relative humidity are overcome by the invention disclosed herein by providing a sensing device using inorganic chemical salt compositions with enhanced color change characteristics so that the changes in color of the inorganic chemical salt compositions in response to changes in the condition being sensed are easily visually perceived. Because relative humidity is a function of both temperature and the amount of water vapor in the air, these inorganic chemical salt compositions can be used to sense either relative humidity or temperature. This enhanced color change characteristic is accomplished by dispersing the inorganic chemical salt compositions in a transparent layer of carrier material to form a filter cell so that light passing therethrough is filtered by the inorganic salt composition in the filter cell. A light reflective layer is positioned on that side of the filter cell opposite the person viewing same so that light passes through the filter cell from the same side as the viewer and is then reflected back through the filter cell to the viewer. Thus, the light is filtered twice before it reaches the viewer and the brightness of the color of the inorganic salt composition in the filter cell is intensified over that associated with the prior art. The perceivability of the changes in color of the inorganic salt composition of the filter cell may be further enhanced by the application of a flourescent material to the reflective backing layer. To indicate relative humidity, the filter cell is allowed to absorb and desorb water from the surrounding air so that vapor pressure equilibrium exists between the filter cell and the surrounding air. Also, because inorganic salt compositions are used in the filter cell, the filter cell is less sensitive to ultraviolet radiation than the prior art organic liquid crystal compositions.

The apparatus of the invention comprises generally a thin laminae with three basic layers, a transparent support layer, an indicating layer and a reflective backing layer. The support layer provides the structural support for the laminae. The indicating layer is applied to one side of the transparent layer as plurality of discrete filter cells. Each filter cell includes a transparent carrier material with an inorganic salt composition dispersed therein where the inorganic salt composition undergoes color changes in response to changes in relative humidity at the filter cell so as to filter light passing through the cell. The reflective backing layer is applied to the indicating layer on the side of the filter cells opposite the support layer so that light passing through the support layer and the indicating layer is reflected back through the indicating layer and the support layer to amplify the color of the inorganic salt compositions in the filter cells. The transparent support layer may have a mask applied thereto opposite the indicating layer to allow only selected portions of the indicating layer to be seen. A flourescent material may be applied to or incorporated in the reflective backing layer to further intensify the final color as perceived by the viewer.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 4 is a greatly enlarged cross-sectional view taken substantially along the line 4—4 in FIG. 2;

FIG. 5 is a view similar to FIG. 4 showing a modification of the embodiment of FIGS. 2—4 to retard the formation of condensates on the invention;

FIG. 6 is a view similar to FIG. 4 showing another modification of the embodiment of FIGS. 2–4 to prevent access of bulk water to the invention;

FIG. 7 is a transverse cross-sectional view of the invention incorporated in a tubular member to sense the condition of the fluid medium passing through the tubular member; and, FIG. 8 is a longitudinal cross-sectional view of the invention seen in FIG. 7.

DETAILED DESCRIPTION OF ILLUSTRATIVE EMBODIMENTS

Figure 1:
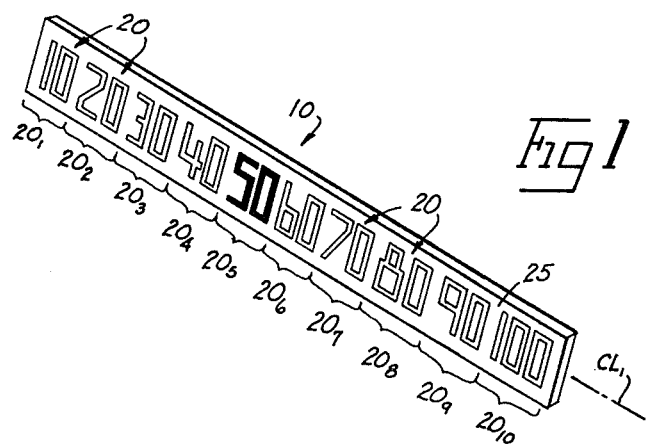
FIG. 1 is a perspective view of one embodiment of the invention to sense relative humidity.
Figure 2:
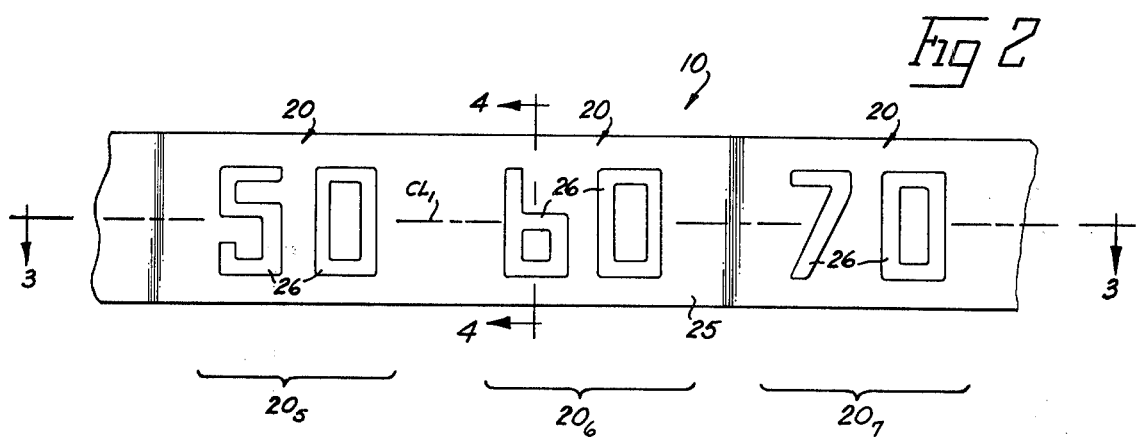
FIG. 2 is a partial enlarged front view of the invention of FIG. 1.

Referring to FIGS. 1–4, it will be seen that the sensing device 10 comprises generally an elongate transparent structural support layer 11 defining a front viewing surface 12 on one side thereof and a back sensing surface 14 on the opposite side thereof, an indicating layer 15 attached to the back sensing surface 14 of the structural support layer 11 and a reflective layer 16 attached to that side of the indicating layer 15 opposite the support layer 11. It will be noted that the device 10 has a longitudinal centerline $CL_1$ extending along the length thereof and that the device is divided into a plurality of indicating segments 20 referenced as segments $20_1$ thru $20_{10}$ in FIG. 1 for purposes of differentiating between the segments. It will be noted that each of the segments $20_1$–$20_{10}$ are transversely oriented with respect to the centerline $CL_1$ so that the device 10 is divided into the segments along its length.

Figure 3:
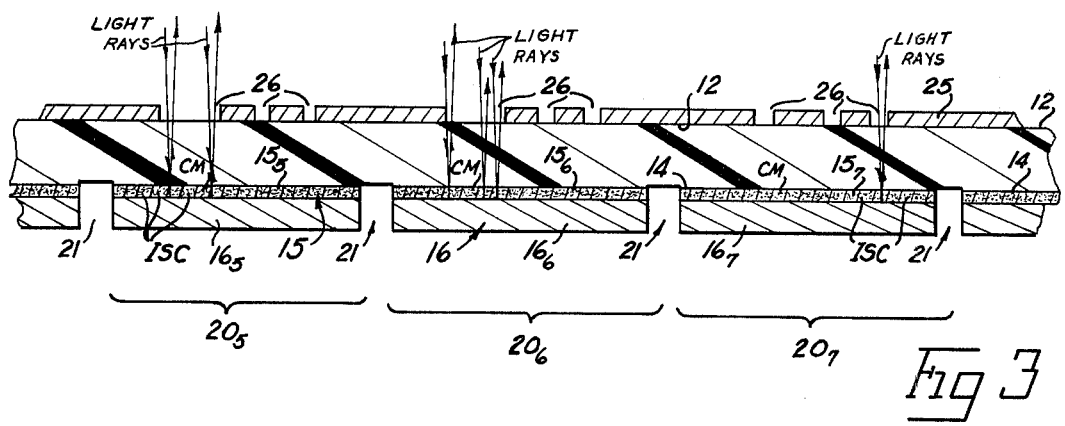
FIG. 3 is a greatly enlarged cross-sectional view taken substantially along line 3—3 in FIG. 2.

The indicating layer 15 is divided into separate filter cells $15_1$–$15_{10}$ in correspondence to the segments $20_1$ thru $20_{10}$ with filter cells $15_5$–$15_7$ being illustrated in FIG. 3. It is filter cells $15_1$–$15_{10}$ that, in effect, divide the device 10 up into segments $20_1$–$20_{10}$ since each filter cell $15_1$–$15_{10}$ is responsive to a different relative humidity to change its color. For instance, the filter cell $15_5$ undergoes a color change in the neighborhood of 50% relative humidity, the filter cell $15_6$ undergoes a color change in the neighborhood of 60% relative humidity and filter cell $15_7$ undergoes a color change in the neighborhood of 70% relative humidity. Each of the filter cells $15_1$–$15_{10}$ contain different compositions of humidity sensing inorganic chemical salts which undergo a visible color change at a selected relative humidity from about 10% up to about 100%. The inorganic salt compositions in the various filter cells $15_1$–$15_{10}$ are selected so that they have the desired and selected specific change response at the relative humidity associated with the segment to indicate the actual relative humidity. Illustrative and representative, but not necessarily inclusive, of such useful indicators, and humidity-sensing compositions, salts, and the like taught by U.S. Pat. Nos. 2,460,065; 2,460,066; 2,460,067; 2,460,068; 2,460,069; 2,460,070; 2,460,071; 2,460,072; 2,460,073; 2,460,074; 2,580,737; and 2,627,505; and publications such as "Cobaltous Chlorides as a Water Vapor Indicator", A. J. Cameron, Chemistry and Industry, Mar. 13, 1965, page 461; "Color Changes Which Occur When Co Thiocyanate Impregnated Paper is Exposed to Air May be Used to Measure Humidity," Chemical Processing (London), November, 1960, page 29; "Estimation of Humidity with Cobalt Thiocyanate Paper and Permanent Color Standards," M. E. Solomon, Bulletin Entomological Research, 48 (1957), pages 489–506; and "Use of Cobalt Salts as Indicators for Humidity and Moisture," M. E. Solomon, Ann. Appl. Biology, 32 (1945), pages 75–78. These compositions, especially those using Cobalt Thiocyanate $[CO(CNS)_2]$ change their light transmission spectrum in response to changes in the relative humidity impressed on the composition and thus act as a strong color filter when light is allowed to pass through the composition. Each composition will have a first color below its transition relative humidity and will change to a second color above its transition relative humidity. Normally each composition will be substantially neutral gray in color at its transistion relative humidity. From the foregoing, then, it will be seen that a different inorganic salt composition is selected for each of the separate filter cells $15_1$–$15_{10}$ in order to obtain the desired color change at the desired relative humidity.

The structural support layer 11 is usually a thin flexible elongate plastic strip. Conveniently, ethylene polyterephthalate (Mylar) may be employed as the support layer 11. The support layer 11 is usually at least 1 mil in thickness and usually does not exceed 20 mils in thickness depending on the ultimate use of the sensing device. It is to be understood, however, that other types of material may be used in lieu of the Mylar sheet indicated. Normally, this support layer 11 is impermeable to moisture.

Each filter cell $15_1$–$15_{10}$ of the indicator layer 15 contains one of the inorganic salt compositions indicated above which is dispersed throughout the cell. While a number of different dispersion techniques may be used to disperse the inorganic salt compositions in each of the cells $15_1$–$15_{10}$ one technique is to place the inorganic salt composition in contact with a carrier material which has the capability of absorbing and holding the inorganic salt composition in a dispersed manner and also be moisture permeable. This carrier material should be relatively transparent so that light can pass therethrough and should evenly distribute the inorganic salt composition throughout the cell so that the salt composition will filter the light and pass the filtered light therethrough. The filter cells $15_5$–$15_7$ seen in FIGS. 3 and 4 show the carrier material CM in section with the inorganic salt compositions ISC illustrated by dots within the carrier material CM. One carrier material that has provided excellent results is gelatin. Gelatin easily absorbs the salt compositions ISC thereinto and holds these salt compositions in the desired dispersed suspended condition for filtering. Further the gelatin acts in a self limiting manner to control the amount of the inorganic salt composition that will be absorbed. The thickness of the gelatin carrier material determines the total amount of inorganic salt composition that will be absorbed where the amount absorbed is generally directly proportional to the thickness. On the other hand, the response time required for moisture to penetrate or permeate the cell is also directly related to the thickness of the gelatin carrier material so that the thicker the carrier material, the longer the response time. This requires a compromise in the thickness of the carrier material to insure that the carrier material is sufficiently thick to absorb enough of the inorganic salt composition so that the color thereof is easily visually perceived but is sufficiently thin to insure a reasonable response time. A thickness range of 0.0001 inch to 0.001 inch should give reasonable results. One thickness that has been found satisfactory is 0.0005 inch for the gelatin carrier material.

The reflective layer 16 is applied to that side of the indacator layer 15 opposite the support layer 11. The layer 16 is divided into reflective segments $16_1$–$16_{10}$ corresponding to the filter cells $15_1$–$15_{10}$. Each reflecting segment $16_1$–$16_{10}$ serves to reflect light passing through the support layer 11 and the associated filter cell $15_1$–$15_{10}$ to the segment $16_1$–$16_{10}$ back through the associated filter cell $15_1$–$15_{10}$ and the support layer 11 through the viewing surface 12 to the person viewing same. Thus, it will be seen that light passing through each of the filter cells $15_1$–$15_{10}$ from the support layer 11 is filtered by the cell $15_1$–$15_{10}$ and this filtered light is reflected back through the filter cell $15_1$–$15_{10}$ where it is further filtered to enchance the color exhibited by the inorganic salt composition in the cell $15_1$–$15_{10}$. The reflective layer 16 may be made of a number of different materials, however, it has been found that a commercial vinyl-acetate dispersion applied to the back of the filter cell $15_1$–$15_{10}$ provides a satisfactory reflecting layer. The reflective layer 16 is porous or moisture permeable after curing to allow the moisture in the air on the back side of layer 16 to be in intimate contact with the filter cells $15_1$–$15_{10}$ of layer 15. Alternatively, the reflective layer 16 may be moisture impermeable with support layer 11 moisture permeable as long as the moisture in the surrounding air can enter the filter cell. The response time for the moisture in the air to penetrate the filter cells $15_1$–$15_{15}$ is also dependent on the rate at which the moisture can pass through the reflective layer 16. While a number of different thicknesses should carry out this function, a thickness range of about 0.0005 inch to 0.0020 inch for layer 16 has been found quite satisfactory.

The color normally associated with the inorganic salt composition is light pink when the relative humidity in the filter cell is below its color transition range and is blue when the relative humidity in the cell is above its transition range. Normally the inorganic salt composition is neutral gray in color at its transition range. The color incorporated in the reflective backing layer 16, then, can be used to change the colors seen by the viewer as desired. For instance, a white color in the layer 16 causes the colors seen by the viewer to change from pink below transition to gray at transition to blue above transition; a yellow color in the backing layer 16 causes the colors to be seen to change from yellow-orange below transition to yellow at transition to green above transition; and a red-orange color in the backing layer 16 causes the colors to be seen to change from red below transition to red-orange at transition to black above transition.

The intensity of the colors perceived by the viewer can be enhanced by the incorporation of a flourescent pigment in the reflective layer 16. For instance, the addition of an orange flourescent pigment added to a normally white reflective layer 16 causes the color seen by the viewer to change from a bright orange-pink below transition to slate gray at transition to a bright blue above transition. Without the addition of this flourescent pigment, the blue component of the color in the inorganic salt compositions outweigh the red component almost 10 to 1 and the color seen will vary from a very pale pink below transition to a relatively bright blue above transition. While a number of different color flourescent pigments may be added to the reflective backing layer 16, the orange flourescent pigment is generally perffered so that the received color of the particular filter cell $15_1$–$15_{10}$ which is at its transition state will be a slate gray color that is very apparent to the eye. It has been found that when an orange flourescent pigment commercially available a AX-1512 from Dayglo, Inc. is added to the hite reflective layer so that the maximum red component of the color in the inorganic salt composition is about equal in intensity to the maximum blue component, excellent results are obtained to provide a very perceptable slate gray color at the color transition range of the cell $15_1$–$15_{10}$.

It will also be noted that the filter cells $15_1$–$15_{10}$ and the segments $16_1$–$16_{10}$ are physically isolated from each other by grooves 21 extending transversely of the centerline $CL_1$. This prevents migration of the inoganic salt compositions from cell to cell.

The viewing side 12 of the support layer 11 is provided with an opaque mask 25 with indicia openings 26 therethrough to leave certain portions of the viewing surface 12 of the support layer 11 exposed for viewing. The indicia openings 26 are normally formed in the shape of digits such as those illustrated in FIGS. 1 and 2 to permit correlation of the change in color of the particular filter cell $15_1$–$15_{10}$ with the relative humidity being indicated. The opaque mask 25 may be applied in a number of ways, however, one convenience material for use in making the mask is printing ink applied to the viewing surface 12 by printing processes such as screen printing. Any number of different characters may be used as the indicia openings 26 depending on the intended use of the sensing device 10.

It has been found that water in liquid form coming into contact with the filter cell sometimes causes the inorganic salt compositions to bleed out of the filter cells $15_1$–$15_{10}$. One instance in which the water in its liquid phase that is sometimes encountered is when the air in contact with the permeable reflective layer 16 has a very high relative humidity. This high relative humidity may cause the water vapor to condense on the back of layer 16 and liquid water to penetrate layer 16 and the filter cells $15_1$–$15_{10}$ which can eventually lead to the bleeding of the inorganic salt compositions from the filter cells $15_1$–$15_{10}$. The penetration of this liquid water through the backing layer 16 can be retarded by the application of a hydrophobic coating 30 as seen in FIG. 5 over the back of the layer 16. While a number of different hydrophobic agents may be used to form the coating 30, a coating of porous plastic material which is commercially available from Glasrock Products, Inc. under their trade name Porex B-50, has been found satisfactory. This coating 30 causes any water vapor condensing on the back of the coating 30 to condense into droplets thus reducing the likelihood of the liquid water passing into the filter cells $15_1$–$15_{10}$ through the permeable backing layer 16.

In some instances, the sensing device 10 may become submerged in water in its liquid phase where the application of a hydrophobic agent to the back of the permeable reflective layer 16 will not be adequate to keep this liquid water out of the filter cells $15_1$–$15_{10}$. In these instances, the filter cells $15_1$–$15_{10}$ and the permeable reflective layer 16 may be separated from the liquid water by a filter 32 seen in FIG. 6 which has the capability of preventing the passage of liquid water therethrough while allowing water vapor to pass therethrough into the cells $15_1$–$15_{10}$ to indicate relative humidity. The filter 32 forms a water vapor pocket 34 about the filter cells $15_1$–$15_{10}$ and the backing layer 16 to allow the water vapor and air passing into the pocket 34 to freely pass into and out of the filter cell $15_1$–$15_{10}$ to accurately indicate the relative humidity. In that embodiment shown in FIG. 6, the support layer 11 has been extended transversely to the centerline thereof to provide attachment points for the filter 32 above and below the filter cells $15_1$–$15_{10}$ and the reflective backing layer 16.

One application in which the sensing device 10 can be easily used is in a detector 40 seen in FIGS. 7 and 8 used to indicate the relative humidity in the output of various types of respiratory/inhalation therapy equipment (not shown) wherein it is desirable to maintain a prescribed relative humidity in the output of such equipment. FIG. 7 is a transverse cross-sectional view of this detector 40 and FIG. 8 is a longitudinal cross-sectional view of the detector 40. It will be seen that the detector 40 comprises a tubular body 41 with a seamless side wall 42 defining a central passage 44 therethrough along its centerline $CL_T$. The tubular body 41 may be provided with reduced diameter end portions 45 designed to slidably receive the output tubing T of the respiratory/inhalation therapy equipment thereon as seen in FIG. 8 so that the detector 40 can be inserted in the output tubing T at a convenient location in the circuit. Thus, it will be seen that the respirable fluid output from the equipment will pass through the passage 44 in housing 41. At some desired circumferential location, the sensing device 10 is attached to the inside of the side wall 42 so that the permeable reflective layer 16 is exposed to passage 44 so the changes in relative humidity of the fluid output from the respiratory/inhalation equipment will be quantified by the sensing device 10. A filter 46 made of similar material to the filter 32 is also carried in the housing 41 in a sealing engagement with the inside of the side wall 46 about passage 44. The filter 46 includes an inwardly turned portion 48 defining a vapor chamber 49 about the sensing device 10 so that if the interior of the tubing T and thus the passage 44 becomes flooded with liquid water, this water is precluded from passing through the filter 46 into the vapor space 49 to prevent the inorganic salt compositions from bleeding from the filter cells in the device 10.

I claim:

1. A sensing device for visually indicating changes in certain predetermined conditions comprising:
    a transparent support layer having a viewing side and a sensing side opposite side viewing side;
    an indicator layer operatively associated with the sening side of the support layer comprising at least one composition whose light transmission spectrum changes in response to changes in certain predetermined conditions so that the transmitted light spectrum through said indicator layer provides a known visible response to changes in the certain predetermined conditions, said indicator layer internally reflecting substantially no visually perceivable spectrum of the light incident thereon; and,
    a reflective layer operatively associated with that side of said indicator layer opposite said support layer so that the light spectrum transmitted through said support layer and said indicator layer is reflected back through said indicator layer and said support layer so that the transmitted light spectrum is visible from the viewing side of said support layer.

2. The sensing device of claim 1 wherein said indicator layer comprises at least one filter cell including a transparent carrier material which transmits therethrough substantially the complete light spectrum incident thereon and on inorganic salt composition dispersed in said transparent carrier material, said inorganic salt composition having a light transmission spectrum which changes in response to changes in certain predetermined conditions so that the transmitted light spectrum provides a known visible response to changes in the certain predetermined conditions.

3. The sensing device of claim 2 wherein said inorganic salt composition changes its light transmission spectrum in response to changes in the amount of moisture present in said filter cell.

4. The sensing device of claim 3 wherein said reflective layer is moisture permeable.

5. The sensing device of claim 3 further including a mask operatively associated with the viewing side of said support layer, said mask layer partly covering said viewing side of said support layer for selectively allowing the entry of light therethrough in selected portions of said viewing side of said support layer for transmission through said support layer and said filter cell to said reflective layer whereupon the transmitted light spectrum is reflect back through said filter cell and said support layer to be visible at the selected portions of said viewing side of said support layer.

6. The sensing device of claim 3 wherein said inorganic salt composition includes cobalt thiocynate.

7. The sensing device of claim 3 wherein the filter cell is capable of absorbing moisture therein.

8. A sensing device for visually indicating changes in selected relative humidity conditions in a fluid medium comprising:
    a transparent support layer having a viewing side and a sensing side opposite said viewing side;
    an indicator layer operatively associated with the sensing side of the support layer comprising at least one filter cell including a transparent gelatin carrier material and an inorganic salt composition dispersed in said transparent carrier material that provides a known visible response to changes in relative humidity conditions in the filter cell; and,
    a reflective layer operatively associated with that side of said indicator layer opposite said support layer, said reflective layer being moisture permeable and exposed to the fluid medium whose relative humidity is to be quantified so that light passing through said support layer and said indicator layer is reflected back through said indicator layer and said support layer through the viewing side of said support layer so as to be visible from the viewing side of said support layer.

9. The sensing device of claim 8 wherein said reflective layer further includes a flourescent pigment to enhance the perceived color changes exhibited by said indicator layer.

10. The sensing device of claim 9 wherein said inorganic salt composition includes cobalt thiocyanate.

11. The sensing device of claim 10 wherein said reflective layer is white and wherein said flourescent pigment is orange.

12. The sensing device of claim 8 further including a filter means through which said reflective layer is exposed to the fluid medium to prevent the passage of fluid in liquid form from the liquid medium through said filter means into said filter cell.

* * * * *